(12) United States Patent
McRae

(10) Patent No.: US 11,600,245 B2
(45) Date of Patent: Mar. 7, 2023

(54) SYSTEM, APPARATUS, AND METHOD FOR PROVIDING AN INTERACTIVE DEVICE

(71) Applicant: National Christmas Products LLC, Cranford, NJ (US)

(72) Inventor: Michael M. McRae, Ormond Beach, FL (US)

(73) Assignee: National Christmas Products LLC, Cranford, NJ (US)

( * ) Notice: Subject to any disclaimer, the term of this patent is extended or adjusted under 35 U.S.C. 154(b) by 388 days.

(21) Appl. No.: 16/522,300

(22) Filed: Jul. 25, 2019

(65) Prior Publication Data

US 2021/0027747 A1    Jan. 28, 2021

(51) Int. Cl.
| | |
|---|---|
| *G09G 5/12* | (2006.01) |
| *G06F 3/147* | (2006.01) |
| *G06F 3/02* | (2006.01) |
| *A47G 33/08* | (2006.01) |
| *H04W 76/14* | (2018.01) |

(52) U.S. Cl.
CPC ........... *G09G 5/12* (2013.01); *A47G 33/0818* (2013.01); *G06F 3/0202* (2013.01); *G06F 3/147* (2013.01); *A47G 2033/0827* (2013.01); *G09G 2354/00* (2013.01); *G09G 2370/16* (2013.01); *H04W 76/14* (2018.02)

(58) Field of Classification Search
None
See application file for complete search history.

(56) References Cited

U.S. PATENT DOCUMENTS

| | | | |
|---|---|---|---|
| 9,451,391 B1* | 9/2016 | Brenner | H04W 8/005 |
| 2010/0052864 A1* | 3/2010 | Boyer | G05B 19/02 |
| | | | 340/10.4 |
| 2010/0226617 A1* | 9/2010 | Piccionelli | H05B 47/19 |
| | | | 345/2.1 |

\* cited by examiner

*Primary Examiner* — Parul H Gupta
(74) *Attorney, Agent, or Firm* — Ellenoff Grossman & Schole LLP; James M. Smedley; Alex Korona

(57) ABSTRACT

A method is disclosed. The method includes providing an interactive device having at least one of a display screen and an audio component, pairing the interactive device with a user device, transferring data to the interactive device, and displaying images via the display screen or emitting sound via the audio component based on the transferred data. The interactive device is a non-transmitting device.

20 Claims, 7 Drawing Sheets

SYSTEM, APPARATUS, AND METHOD FOR PROVIDING AN INTERACTIVE DEVICE

TECHNICAL FIELD

The present disclosure generally relates to a system, apparatus, and method for providing a device, and more particularly to a system, apparatus, and method for providing an interactive device.

BACKGROUND

Decorative items are often used in connection with various holidays, festivals, and other celebrations. For example, decorative items of various types and shapes may have significant meaning for given holidays. Christmas tree ornaments are one type of decorative items that are often used.

Christmas tree ornaments include a variety of differently shaped and sized decorations such as, for example, stars, trees, and other holiday-themed decorations. Ornaments may be static, movable (e.g., revolving), and illuminated.

Decorative items such as ornaments typically involve predetermined operating modes that do not deviate from predetermined patterns. Conventional decorative items display or operate according to predetermined modes or criteria that do not change over the course of a service life of the decorative item, which limits operational possibilities of the decorative items.

The exemplary disclosed system, apparatus, and method are directed to overcoming one or more of the shortcomings set forth above and/or other deficiencies in existing technology.

SUMMARY OF THE DISCLOSURE

In one exemplary aspect, the present disclosure is directed to a method. The method includes providing an interactive device having at least one of a display screen and an audio component, pairing the interactive device with a user device, transferring data to the interactive device, and displaying images via the display screen or emitting sound via the audio component based on the transferred data. The interactive device is a non-transmitting device.

In another aspect, the present disclosure is directed to an interactive device. The interactive device includes a housing, a data storage, a controller configured to pair the interactive device with the user device, the pairing allowing one-way image and audio data transfer from the user device to the interactive device, a display screen controlled by the controller, and an audio component controlled by the controller. The display screen displays images and the audio component emits sound based on the one-way image and audio data transfer.

DETAILED DESCRIPTION AND INDUSTRIAL APPLICABILITY

The exemplary disclosed system, apparatus, and method may include an interactive device that may be controlled or affected based on a presence or actions of a user and/or another device such as a mobile device (e.g., smartphone or other computing device). For example, the exemplary disclosed system, apparatus, and method may include a decorative item such as an ornament that operates based on input received from a user via physical manipulation, input data received from a user device, input received from an external data source, and/or any other suitable control technique. The exemplary disclosed system, apparatus, and method may include an interactive ornament that may entertain users and/or add to a holiday atmosphere based on interacting with nearby users to display images, emit sound such as music or audio messages, provide illumination, and/or other suitable indications that may be customized to specific users (e.g., nearby users). The exemplary disclosed system, apparatus, and method may include decorative or meaningful display items (e.g., interactive devices) for events of any culture or tradition around the world.

In at least some exemplary embodiments, the exemplary disclosed system, apparatus may provide an audio visual display decoration. For example, the exemplary disclosed system, apparatus and method may provide an interactive audio-visual display decoration (e.g., ornament) that displays and produces videos and static pictures with and without sound that receive their display and audio information from external sources in real time and/or from loaded memory.

Figure 1:
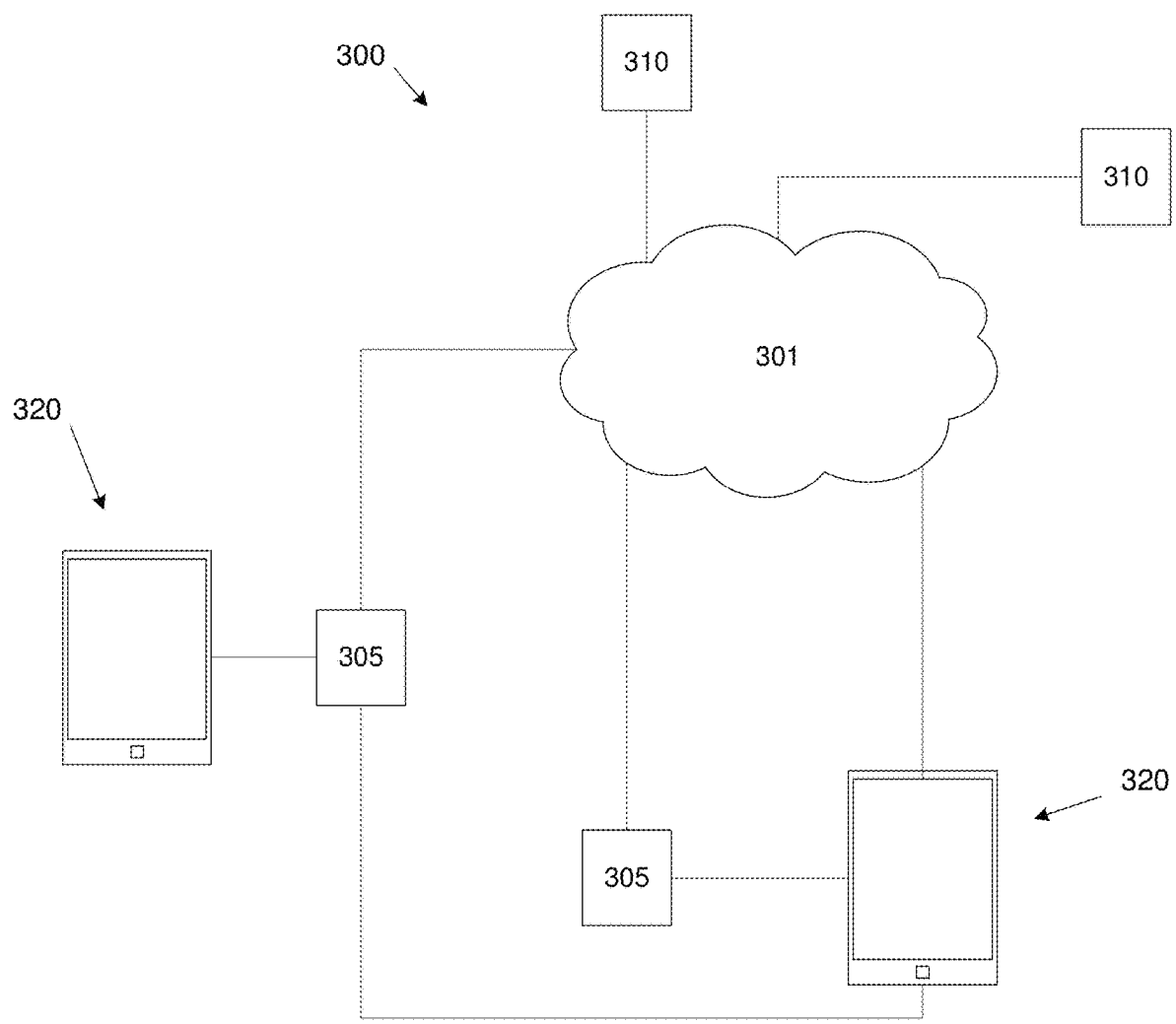
FIG. 1 illustrates an exemplary disclosed system of at least some exemplary embodiments of the present disclosure.

In at least some exemplary embodiments and as illustrated in FIG. 1, a system 300 may include one or more devices 305, one or more modules 310, and one or more user devices 320. For example, system 300 may include a plurality of devices 305, modules 310, and/or user devices 320. Device 305, module 310, and user device 320 may be connected for example via network 301. For example, device 305 may be a physical device that interacts with the other components of system 300. System 300 may include components (e.g., network 301 and module 310) that may be similar to exemplary components described below regarding FIGS. 8 and 9.

Network 301 may be any suitable network as described for example below. Applications operating on system 300 may retrieve and manipulate information in storage devices and exchange information through network 301 that may be a WAN (e.g., the Internet or other suitable network). Information may be exchanged over network 301 through one or more high speed connections such as over-the-air (OTA) connections.

Device 305 may be any suitable interactive device. For example, device 305 may be a decorative item. Device 305 may be an ornament such as a holiday ornament. Device 305 may be a Christmas ornament such as a Christmas tree ornament. For example, device 305 may be any suitable decorative item such as the exemplary decorative items illustrated in FIGS. 2-6 and described below.

Device 305 may be formed from any suitable materials such as, for example, polymer material, structural metal (e.g., structural steel), co-polymer material, textile material, thermoplastic and thermosetting polymers, resin-containing material, polyethylene, polystyrene, polypropylene, epoxy resins, phenolic resins, Acrylanitrile Butadiene Styrene (ABS), Polycarbonate (PC), Mix of ABS and PC, Acetal (POM), Acetate, Acrylic (PMMA), Liquid Crystal Polymer (LCP), Mylar, Polyamid-Nylon, Polyamid-Nylon 6, Polyamid-Nylon 11, Polybutylene Terephthalate (PBT), Polycarbonate (PC), Polyetherimide (PEI), Polyethylene (PE), Low Density PE (LDPE), High Density PE (HDPE), Ultra High Molecular Weight PE (UHMW PE), Polyethylene Terephthalate (PET), PolPolypropylene (PP), Polyphthalamide (PPA), Polyphenylenesulfide (PPS), Polystyrene (PS), High Impact Polystyrene (HIPS), Polysulfone (PSU), Polyurethane (PU), Polyvinyl Chloride (PVC), Chlorinated Polyvinyl chloride (CPVC), Polyvinylidenefluoride (PVDF), Styrene Acrylonitrile (SAN), Teflon TFE, Thermoplastic Elastomer (TPE), Thermoplastic Polyurethane (TPU), and/or Engineered Thermoplastic Polyurethane (ETPU), or any suitable combination thereof.

Module 310 may communicate with other components of system 300 either directly or via network 301. Module 310 may also be partially or substantially entirely integrated with one or more components of system 300 such as, for example, network 301, user device 320, and/or one or more devices 305. Module 310 may be a software module as described for example below. For example, module 310 may include computer-executable code stored in non-volatile memory. Module 310 may also include a processor, or alternatively, a processor for processing data associated with system 300 that may be partially or substantially entirely integrated into any portion (e.g., or combination of portions) of system 300 (e.g., network 301, one or more user devices 320, and/or one or more devices 305). Module 310 may store data and/or be used to control some or all of the exemplary disclosed processes described herein.

User device 320 may be any suitable user device for receiving input and/or providing output (e.g., raw data or other desired information) to a user. User device 320 may be, for example, a touchscreen device (e.g., of a smartphone, a tablet, a smartboard, and/or any suitable computer device), a computer keyboard and monitor (e.g., desktop or laptop), an audio-based device for entering input and/or receiving output via sound, a tactile-based device for entering input and receiving output based on touch or feel, a dedicated user device or interface designed to work specifically with other components of system 300, and/or any other suitable user device or interface. For example, user device 320 may include a touchscreen device of a smartphone or handheld tablet. For example, user device 320 may include a display that may include a graphical user interface to facilitate entry of input by a user and/or receiving output. For example, system 300 may provide notifications to a user via output transmitted to user device 320.

Figure 2:
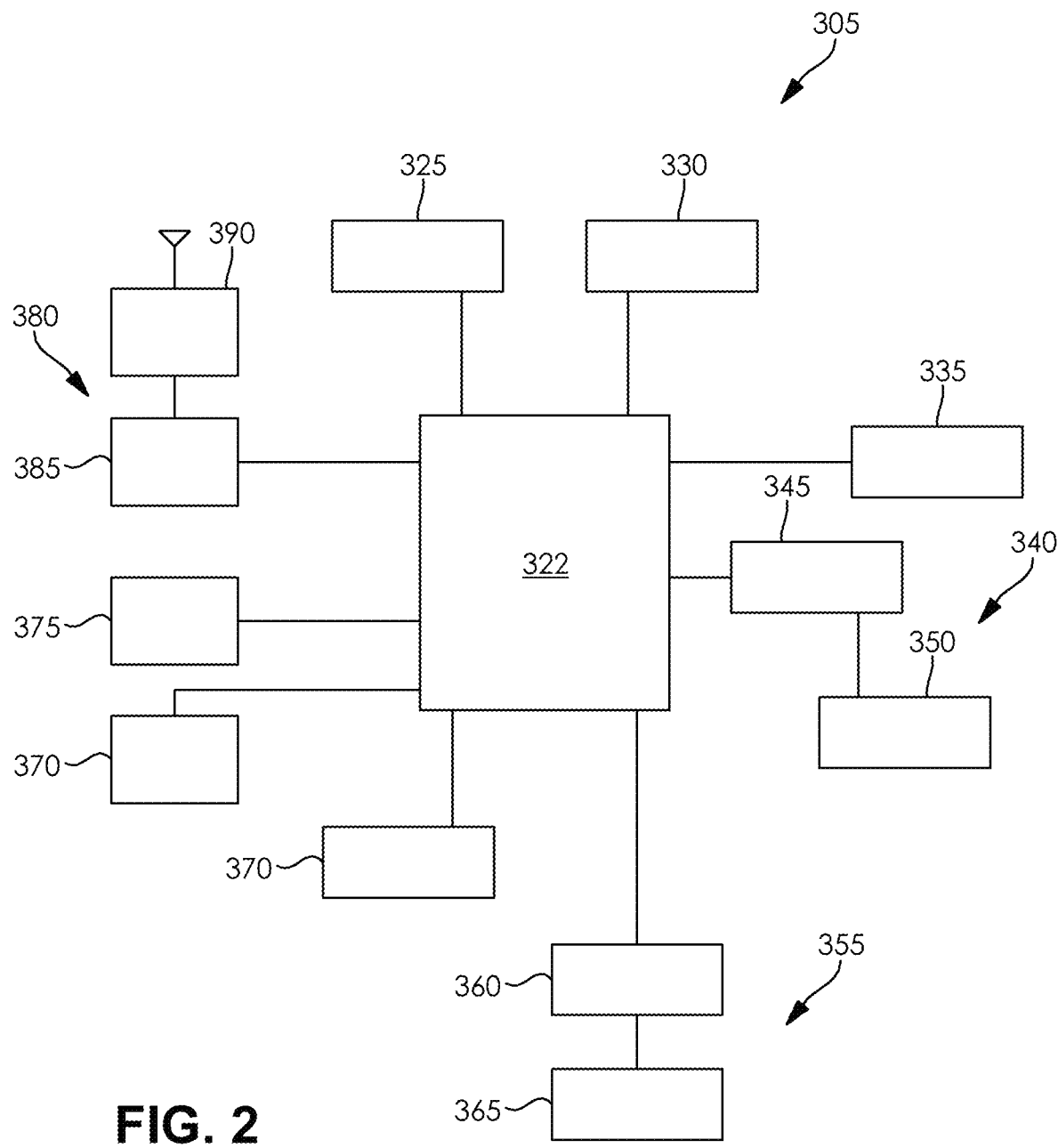
FIG. 2 illustrates a schematic view of at least some exemplary embodiments of the present disclosure.

FIG. 2 schematically illustrates device 305. FIG. 2 is an exemplary block diagram schematically illustrating parts of device 305 (e.g., parts involved in electronic functions). FIG. 2 illustrates a plurality of exemplary components that may be included in device 305. A given device 305 may include some or all of the exemplary components illustrated in FIG. 2. The plurality of components may be electrically connected to a controller 322 as illustrated in FIG. 2.

Controller 322 may control an operation of device 305. Controller 322 may include for example a processor (e.g., micro-processing logic control device) or board components. Also for example, controller 322 may include input/output arrangements that allow it to be connected (e.g., via wireless and/or electrical connection) to other components of system 300. For example, controller 322 may control an operation of device 305 based on input received from module 310, user device 320, and/or input provided directly to device 305 by a user (e.g., as described herein). Controller 322 may communicate with components of device 305 and/or system 300 via wireless communication and/or via electrical lines.

Device 305 may for example include a component 325 and component 330 that may be interface components. For example, components 325 and 330 may be interface components for receiving and transferring data from a storage medium. For example, component 325 may be a component (e.g., a card slot) for receiving a memory card such as a flash memory card (e.g., a Mini SD card). Component 330 may be a Universal Serial Bus (USB) port that may connect device 305 with any suitable device such as a storage device (e.g., a flash drive or an external hard drive), a media device (e.g., a digital camera), or any other suitable computing or electronic device.

Device 305 may include a component 335 that may be a display component. For example, component 335 may be a liquid-crystal display (LCD), a light-emitting diode (LED) display, or any other suitable type of electronic display. Component 335 may for example be a display mounted on device 305 that displays images (e.g., videos and/or pictures).

Device 305 may include a component array 340 that may be an audio component array. Component array 340 may include a component 345 and a component 350 that may be any suitable audio components. For example, component 345 may be any suitable type of audio amplifier and component 350 may be any suitable type of audio speaker.

Device 305 may include a component array 355 that may be an energy harvesting component array. Component array 355 may include a component 360 and a component 365 that may be energy harvesting components. For example, component 360 may include any suitable type of energy harvesting circuitry and component 365 may be any suitable type of energy harvesting coil (e.g., a capacitor-type coil). Component array 355 may also include a battery similar to the exemplary battery described below regarding FIG. 6. For example, component array 355 may include any suitable high efficiency battery such as a graphine high density battery that may allow for relatively quick charging times and long duration of use before recharging. In at least some exemplary embodiments, component array 355 may include energy harvesting circuitry coupled with a high efficiency battery to reduce connection times (e.g., charging times) to a wired charging system.

Returning to FIG. 2, device 305 may also include one or more components 370 that may be any suitable memory components. For example, component 370 may include a computer storage as described for example herein.

Device 305 may include a component 375 that may include any suitable electronic oscillator circuit. For example, component 375 may be a crystal oscillator such as a clock crystal oscillator.

Device 305 may include a component array 380 that may be a communication component array. Component array 380 may include a component 385 and a component 390 that may be any suitable communication components. For example, component 385 may be any suitable type of receiver device (e.g., a Wi-Fi/Bluetooth receiver) and component 390 may be any suitable type of amplifier. In at least some exemplary embodiments, component array 380 may include any suitable transceiver device (e.g., transmitter device and/or receiver device) for transmitting data to other components of system 300 and also for receiving data from other components of system 300. In at least some exemplary embodiments, component 385 may be a receiver and not a transmitter to provide a non-transmitting device as described for example below. For example, device 305 may use component array 380 to wirelessly receive (e.g., and/or transmit) data by any suitable technique such as, e.g., wirelessly transmitting data via any suitable network (e.g., network 301 or any other suitable network). Device 305 may use component array 380 to receive (e.g., and/or transmit) data at any desired constant or variable interval and/or substantially continuously.

Figure 3:
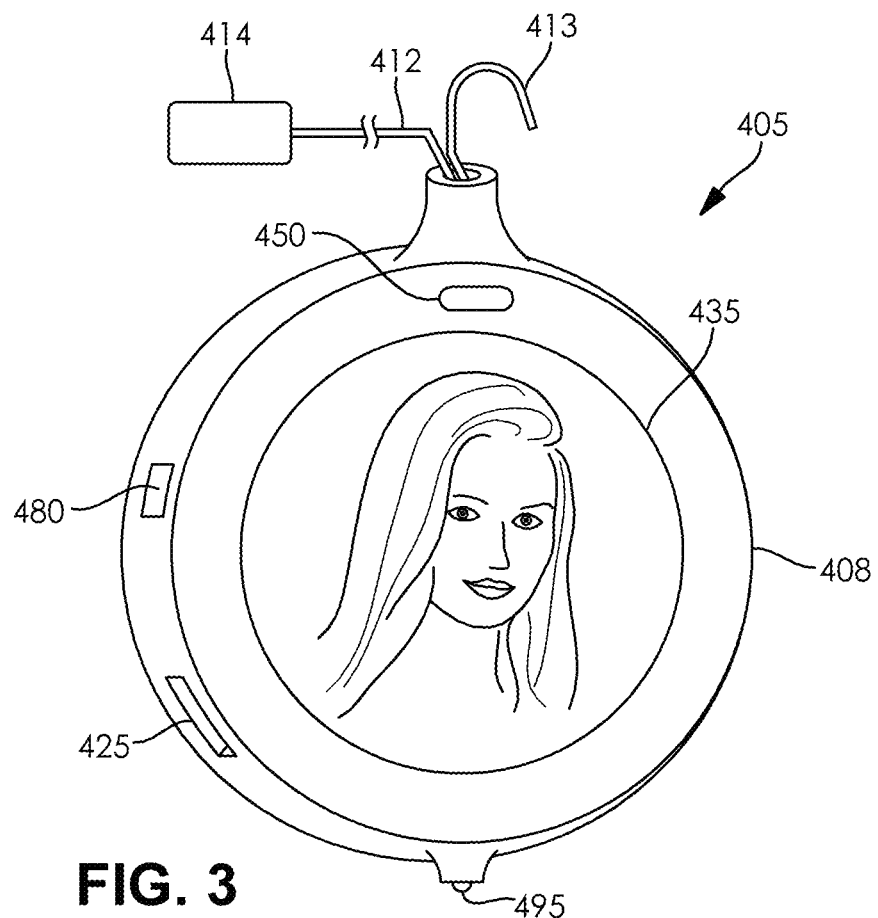
FIG. 3 illustrates a front view of at least some exemplary embodiments of the present disclosure.

FIG. 3 illustrates another exemplary embodiment of the exemplary disclosed system. Device 405 may include components that may be generally similar to components of device 305. FIG. 3 illustrates a frontal view of device 405, which may be a round ornament (e.g., a ball-shaped body) having a flat-faced housing 408 (e.g., an ornament body) on which a component 435 (e.g., a flat display screen) that may be similar to component 335 is mounted. Component 435 may display an image such as a picture or video. Device 405 may also include a component 450 (e.g., a speaker) that may be similar to component 350. Device 405 may include a component 425 (e.g., a receiving socket slot for a mini-scan disc) that may be similar to component 325. For example, a mini SD card (e.g., or other suitable storage device) may be inserted into component 425. Device 405 may also include a component 480 (e.g., including an internal Wi-Fi/Bluetooth receiver) that may be similar to components of component array 380. Device 405 may receive display commands (e.g., commands received by a controller that may be similar to controller 322 to control component 435) via component 425 and/or component 480.

An electrical member 412 (e.g., a power cord or cable) may exit a top portion of device 405 adjacent to an attachment device 413. Attachment device 413 may be any suitable attachment device such as, for example, a hanger (e.g., an ornament hanger), a bolt, a screw, a magnetic fastener, a hook and loop fastener, an adhesive material, and/or any other suitable attachment device. Electrical member 412 may connect to a DC or AC power source via a component 414 (e.g., adapter or power plug including for example an AC to DC adapter). For example, component 414 may be a dc plug or an ac/dc adapter plug disposed at an end portion of electrical member 412 (e.g., power cord).

Device 405 may also include a component 495 that may be an input device. For example, component 495 may be a button, switch, or other mechanical component that may be actuated by a user to start, stop, and/or control an operation of device 405. For example, component 495 may be a push button switch. Component 495 may be actuated by a user to turn power of device 405 on and/or off or to control an operation of device 405 (e.g., to control an image display of component 435 and/or sounds being emitted by component 450). Component 495 may be disposed (e.g., mounted) at a bottom portion of device 405.

Figure 4:
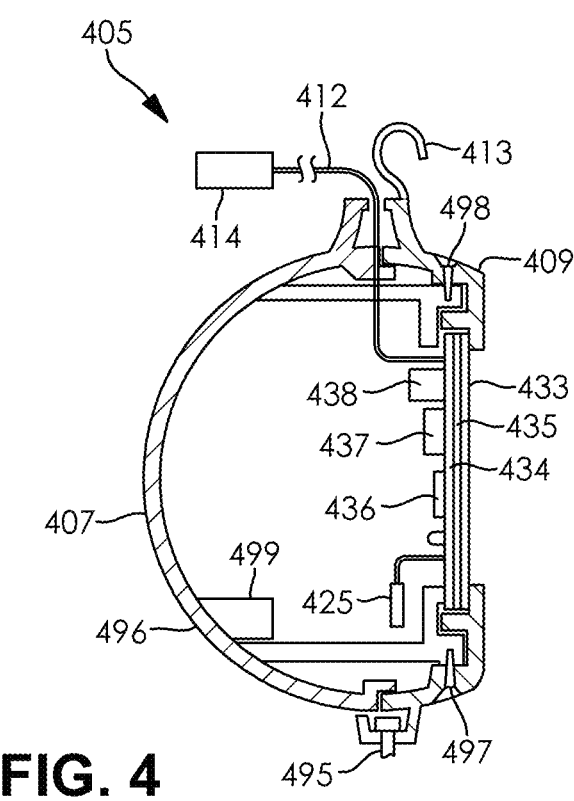
FIG. 4 illustrates a sectional view of at least some exemplary embodiments of the present disclosure.

FIG. 4 illustrates a side cross-sectional view of device 405. Device 405 may have a ball-shaped rear portion 407 (e.g., body back) and a flat front portion 409 (e.g., body front). A member 433 (e.g., clear glass protective face) may be disposed (e.g., mounted) on component 435 (e.g., LCD screen). Component 435 may be disposed on a member 434 (e.g., an electronic circuit board). For example, component 435 may be mounted on a back side of member 434. As illustrated in FIG. 4, component 425 (e.g., SD mini card socket) may be connected to component 434.

Device 405 may include a plurality of components that may be disposed on component 434 (e.g., electronic circuit board). For example, a component 436, a component 437, and a component 438 may be disposed on component 434. Components 436, 437, and 438 may be surface-mounted electronics (e.g., any suitable electronics for use in an operation of device 405 such as data storage and transfer, imaging, power supply, audio, and/or any other suitable components) that may be mounted on component 434.

A plurality of fasteners may hold portions 407 and 409 together. For example as illustrated in FIG. 4, a fastener 496, a fastener 497, and a fastener 498 may secure portions 407 and 409 together. Fasteners 496, 497, and 498 may be any suitable fasteners such as, for example, screws, bolts, magnetic fasteners, hook and loop fasteners, adhesive materials, and/or any other suitable attachment devices. Device 405 may also include a member 499 that may be a counterweight (e.g., a weight including dense material such as metal material, e.g., steel or lead).

Figure 5:
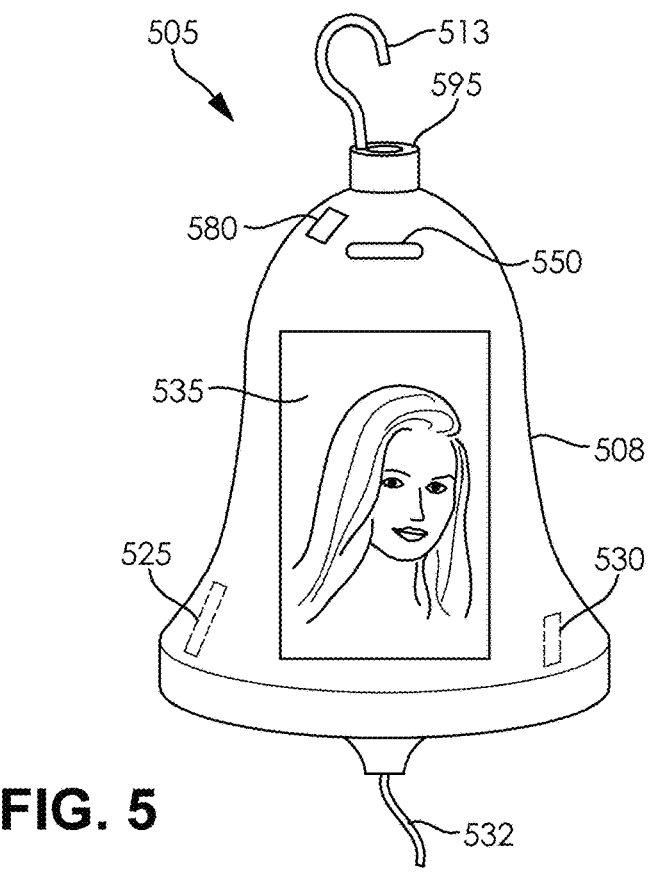
FIG. 5 illustrates a front view of at least some exemplary embodiments of the present disclosure.
Figure 6:
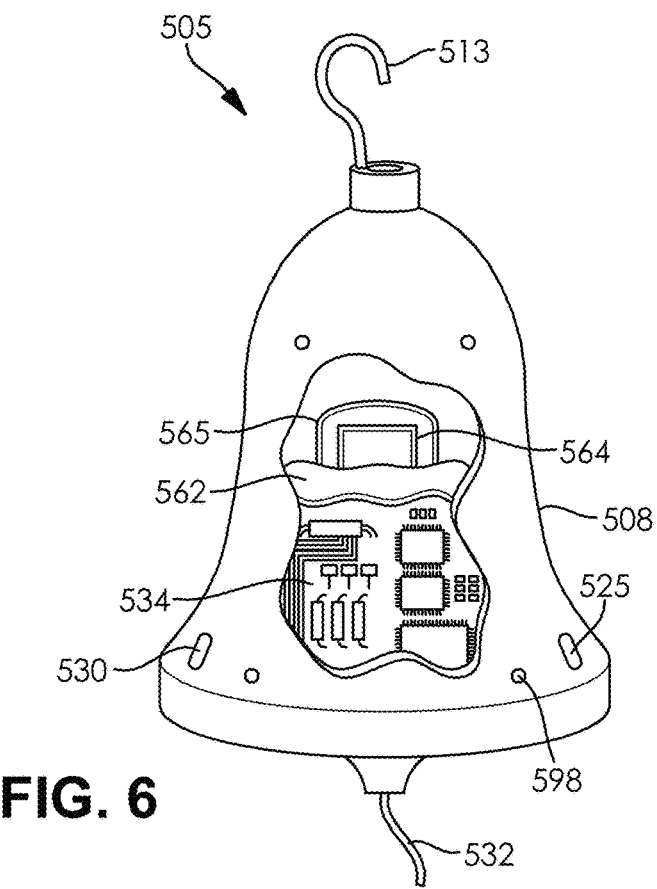
FIG. 6 illustrates a schematic rear view of at least some exemplary embodiments of the present disclosure.

FIGS. 5 and 6 illustrate another exemplary embodiment of the exemplary disclosed system. FIG. 5 illustrates a front side of device 505 and FIG. 6 illustrates a rear side of device 505. Device 505 may include components that may be generally similar to components of device 305. Device 505 may be a bell-shaped ornament having a housing 508 (e.g., an ornament body) that may be a flat face housing (e.g., having a flat face similar to portion 409). Device 505 may include a component 535 (e.g., a display screen for displaying a picture or video image) that may be similar to component 335. Device 505 may also include a component 550 (e.g., a speaker) that may be similar to component 350. Device 505 may also include a component 525 (e.g., a receiving socket slot for a mini-scan disc) that may be similar to component 325 at a lower portion of device 505 (e.g., at a rear side of device 505 as illustrated in FIG. 6 and also in phantom in FIG. 5). Device 505 may further include a component 530 (e.g., a USB port) that may be similar to component 330 at a lower portion of device 505 (e.g., at a rear side of device 505 as illustrated in FIG. 6 and also in phantom in FIG. 5). Component 530 may for example allow device 505 to be connected to a flash drive or any other suitable signal sources (e.g., including power charging). Device 505 may also include a component 580 (e.g., Wi-Fi/Bluetooth receiver) that may be similar to component 380.

Device 505 may include a component 532 that may be any suitable component for transferring power to device 505. For example, component 532 may be a charging port that may connect to a mobile device charging cable such as a smartphone cable. Component 532 may be located at a bottom portion of device 505 or at any other desired location on device 505 (e.g., a side portion or a rear portion).

Device 505 may include an attachment device 513 (e.g., hanger) that may be similar to attachment device 413. Device 505 may also include a component 595 that may be an actuating component. For example, component 595 may be a switch disposed at an upper portion (e.g., top) of device 505 and may be operably connected to attachment device 513. In at least some exemplary embodiments, component 595 may be a hanger quarter turn off/on switch that may start or stop an operation of device 505. Device 505 may receive display commands (e.g., commands received by a controller that may be similar to controller 322 to control component 535 and/or component 550) via component 525 and/or component 580.

FIG. 6 illustrates a back-side cutaway view of device 505 showing an exemplary relative arrangement of components of device 505. Device 505 may include a component 534 (e.g., circuit board with a back of the circuit board shown) that may be similar to component 434. Device 505 may include an insulation layer 562 that may be formed from any suitable insulating materials (e.g., rubber, resin, PVC, glass, and/or any other suitable insulating materials). Device 505 may include a power storage 564 that may be any suitable battery (e.g., a high efficiency battery such as a graphine high density battery) or any other suitable power storage. Device 505 may also include a component 565 (e.g., energy harvesting coil) that may be similar to component 365. Insulation layer 562 may be for example located between component 534 and components 564 and 565, between parts of component 565, and/or between ay other suitable components of device 505. A plurality of fasteners 598 that may be similar to fasteners 498 may fasten portions of housing 508 together.

The exemplary disclosed device may include some or all components of each of device 305, device 405, and device 505.

In at least some exemplary embodiments, the exemplary disclosed device may include a housing, a data storage, a controller (e.g., controller 322) configured to pair the interactive device (e.g., device 305, device 405, or device 505) with the user device (e.g., user device 320), the pairing allowing one-way image and audio data transfer from the user device to the interactive device, a display screen controlled by the controller, and an audio component controlled by the controller. The display screen displays images and the audio component may emit sound based on the one-way image and audio data transfer. The interactive device may be a non-data-recording passive device. The interactive device may not transmit data to the user device. The interactive device may be both a non-camera-equipped and a non-microphone-equipped device. The interactive device may be a Christmas tree ornament and the housing is bell-shaped or ball-shaped.

The exemplary disclosed system, apparatus, and method may be used in any suitable application for providing an interactive device. For example, the exemplary disclosed system, apparatus, and method may be used in any suitable application for providing an interactive decorative item such as a holiday ornament or any other desired decoration. For example, the exemplary disclosed system, apparatus, and method may be used in any application involving users who may affect or control an interactive device. The exemplary disclosed system, apparatus, and method may be used to provide decorative or meaningful display items (e.g., interactive devices) for events of any culture or tradition around the world.

Figure 7:
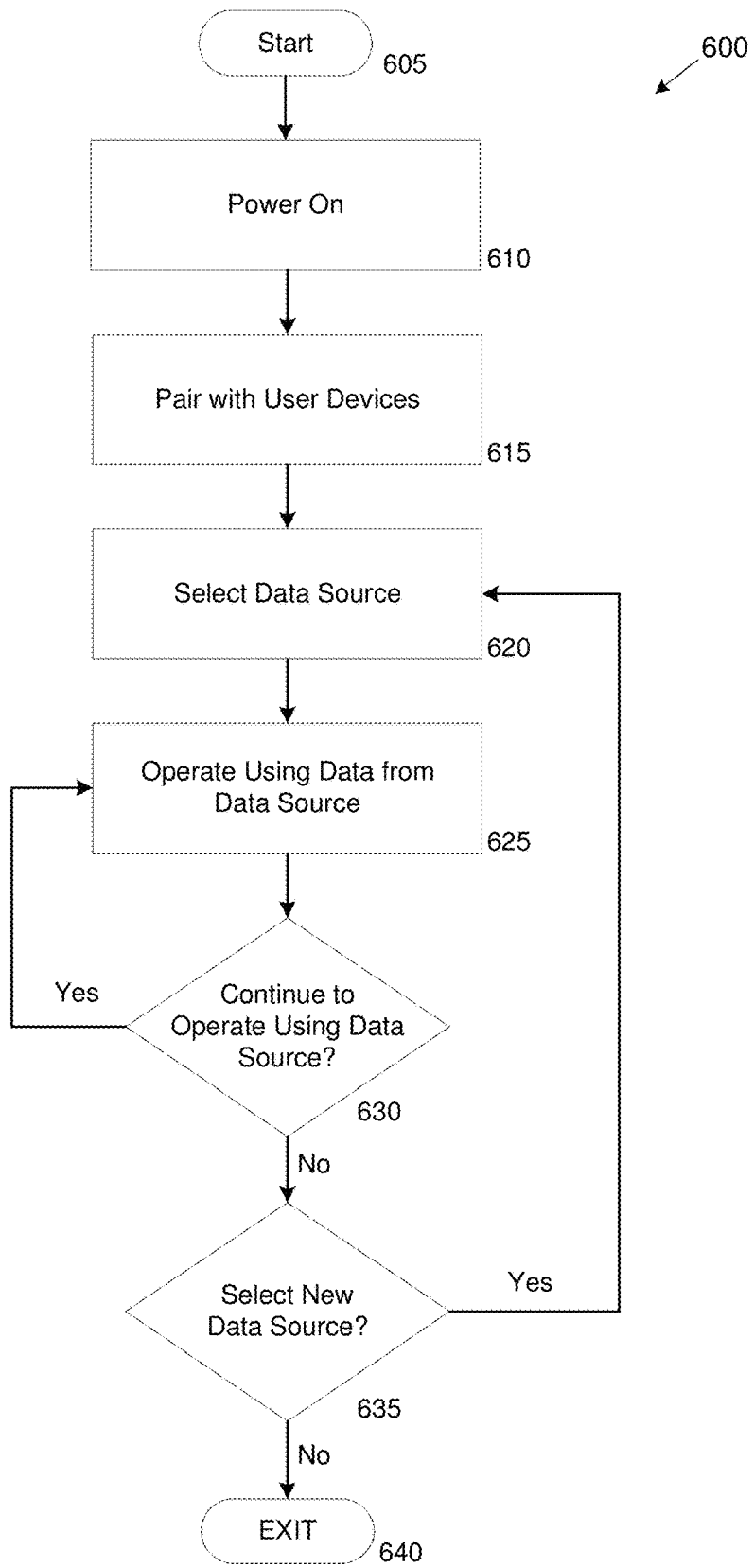
FIG. 7 illustrates an exemplary process of at least some exemplary embodiments of the present disclosure.

FIG. 7 illustrates an exemplary operation of the exemplary disclosed system. Process 600 begins at step 605.

At step 610, the exemplary disclosed device (e.g., device 305, device 405, or device 505) may be powered on. For example, the exemplary disclosed device may have been previously charged (e.g., via component 414 or component 532) and/or actively receive power and may be powered on (e.g., switched on via a power selector such as component 595).

At step 615, the exemplary disclosed device (e.g., device 305, device 405, or device 505) may be paired with one or more user interfaces (e.g., directly or via network 301 with user device 320) and/or with one or more modules 310 via network 301. The exemplary disclosed device may be paired with a user interface or module by any suitable technique. The pairing may be data transmission pairing. The exemplary disclosed device may be configured to be pairable with user device 320. The pairing may be secure (e.g., via PKI or TTP) or non-secure pairing. In at least some exemplary embodiments, the pairing may include an exclusive Wi-Fi or Bluetooth connection that is established between the exemplary disclosed device (e.g., device 305, device 405, or device 505) and another device (e.g., user device 320) of system 300 as illustrated in FIG. 1. For example, the pairing may establish a Wi-Fi/Bluetooth streaming connection (e.g., data-streaming connection).

Pairing between devices may occur based on user input responding to prompts provided to users and/or automatically based on an operation of system 300. For example, a user may use the exemplary app described below to instruct a given user device 320 to pair automatically with the exemplary disclosed device (e.g., device 305, device 405, or device 505). For example, devices may pair automatically when they are within a predetermined distance of each other (e.g., when a given user device 320 is within 10 feet, 20 feet, or any other suitable distance of a given exemplary disclosed device).

At step 620, one or more data sources may be selected as described for example below. In at least some exemplary embodiments, the data source may include information that is stored in a memory medium such as a flash drive or scan disk and inserted (e.g., by a user) into the exemplary disclosed device (e.g., via component 325, component 330, component 425, component 525, and/or component 530). The data may be transferred to a storage (e.g., component 370) of the exemplary disclosed device and/or accessed directly by system 300 (e.g., via an operation of controller 322). Data may thereby be transferred to system 300 for use in process 600.

A real-time data source may also be selected at step 620 as an alternative to or in addition to a data source being physically connected to the exemplary disclosed device (e.g., device 305, device 405, or device 505). For example, data may be provided in real-time, near real-time, and/or at constant or irregular intervals via the exemplary disclosed paired connection described above (e.g., at step 615). For example, data may be transferred to the exemplary disclosed device via the exemplary Wi-Fi/Bluetooth streaming connection described above (e.g., from a paired source or sources such as one or more user devices 320 and/or modules 310). The data may be transferred to a storage (e.g., component 370) of the exemplary disclosed device and/or accessed directly by system 300 (e.g., via an operation of controller 322). Data may thereby be transferred to system 300 for use in process 600.

The data selected and transferred at step 620 may include any suitable data for use with the exemplary disclosed device (e.g., device 305, device 405, or device 505). The data may be any suitable data for display on a decorative item such as an ornament (e.g., a Christmas tree ornament). The data may include image data (e.g., picture and/or video data) and/or audio data (e.g., voice and/or music).

At step 625, the exemplary disclosed device (e.g., device 305, device 405, or device 505) may operate using data from the data selected and transferred at step 620. For example, the exemplary disclosed device may display pictures, display video, emit music, and/or emit voice or other recordings (e.g., display on component 335, component 435, or component 535 and/or emit sound via component 350, component 450, or component 550). The data used for display and/or audio emission may be based on any single data source or combination of data sources described above regarding step 620.

In at least some exemplary embodiments at step 625, the exemplary disclosed device (e.g., device 305, device 405, or device 505) may be paired (e.g., synchronized or synced) to user device 320 that may be a smart device (e.g., a smartphone or smart tablet). User device 320 that may be a paired smart device (e.g., and/or other components or modules of system 300) may run a software application (e.g., an app) as described for example herein. The app may include a series of functions that a user may access using a menu-driven listing of directives such as, for example, "pictures", "music," "real-time streaming," "display internal memory," "videos," "speaker volume," and/or any other suitable menu options for operating the exemplary disclosed app. A user may select a desired function using the app, which may control an operation of the paired exemplary disclosed device (e.g., device 305, device 405, or device 505). A user may use a given user device 320 to control a paired exemplary disclosed device to display images and/or emit sound based on a real-time data stream that is transferred from the given user device 320 to the paired exemplary disclosed device (e.g., device 305, device 405, or device 505) via a paired connection (e.g., Wi-Fi/Bluetooth streaming connection). For example when the exemplary disclosed device is a Christmas ornament or other decorative item of any culture or tradition, the exemplary disclosed device may display Christmas-themed pictures, videos, music, and/or voice or other recordings (e.g., display on component 335, component 435, or component 535 and/or emit sound via component 350, component 450, or component 550) in real-time or near real-time based on data being streamed on the given user device 320 (e.g., images and sounds displayed or emitted by the exemplary disclosed device may match or be identical to those displayed or emitted by user device 320). Any desired images and/or audio may be displayed and/or emitted such as, for example, a video streamed in real-time from the internet (e.g., a video, a movie, or a television show), a webpage, video chat (e.g., FaceTime), a voicemail, an emoji, a text message, and/or any other desired media content that may be displayed on a computing device (e.g., a given user device 320 that may be a smartphone or tablet).

Accordingly in at least some exemplary embodiments, system 300 may provide an interactive real-time display from a given user device 320 (e.g., a smart device) that may be paired to a given exemplary disclosed device (e.g., device 305, device 405, or device 505) that may be a decorative item (e.g., an ornament). The given user device 320 that may be a smart device may transfer data (e.g., feed information) from its internal memory and/or information received from an external source such as network 301 (e.g., that may be the internet) in real-time to the exemplary disclosed device. For example, a family member calling a given user device 320 on FaceTime or my phone may be displayed (e.g., and/or sound emitted) in real-time on the exemplary disclosed device (e.g., device 305, device 405, or device 505). Additionally, such data may be stored on the exemplary disclosed device's internal memory (e.g., component 370) and replayed at will (e.g., replayed based on control by user device 320 and/or pressing a component on the exemplary disclosed device such as component 495). The exemplary disclosed device (e.g., device 305, device 405, or device 505) may display and/or emit sound corresponding to the display and/or audio being emitted by a given user device 320 when a "real-time streaming" option is selected on the exemplary disclosed app.

In at least some exemplary embodiments, the exemplary disclosed device (e.g., device 305, device 405, or device 505) may display images and/or emit sound or audio based on the exemplary disclosed device's internal memory (e.g., component 370) when a "display internal memory" option is selected on the exemplary disclosed app. The exemplary disclosed device may continue to "display internal memory" until, for example, directed to stop by a user based on a new command given to the exemplary disclosed app or a manual switch is pressed on the device (e.g., component 495).

In at least some exemplary embodiments, the exemplary disclosed device (e.g., device 305, device 405, or device 505) may display a picture or video (e.g., on component 335, component 435, or component 535) and/or emit sound such as an audio recording (e.g., holiday music such as Christmas music) based on data stored in an internal storage (e.g., component 370) of the device and/or data received in real-time from a paired device (e.g., user device 320 and/or directly from module 310 via network 301) as described for example herein. For example, a duplicate (e.g., images and/or sound) of a paired user device 320 (e.g., a smart device) may be displayed and/or emitted (e.g., displayed on component 335, component 435, or component 535 and/or sound or audio emitted via component 350, component 450, or component 550) by the exemplary disclosed device (e.g., device 305, device 405, or device 505) in real-time or near real-time.

In at least some exemplary embodiments and based on the exemplary automatic pairing described above at step 615, one or more exemplary disclosed devices (e.g., devices 305, devices 405, and/or devices 505) may begin automatic operation when a given user device 320 is within a predetermined distance (e.g., within 10 feet, 20 feet, or any other suitable distance) of the one or more devices. For example, a given user device 320 may automatically pair with one or more exemplary disclosed devices (e.g., devices 305, devices 405, and/or devices 505), and those devices may automatically begin streaming images, video, and/or audio based on settings provided by a user to the exemplary disclosed app described above. A user may for example turn such a feature on or off as desired (e.g., the default may be an "off" setting to avoid unintended operation). If automatic operation is enabled by a user, one or more exemplary disclosed devices (e.g., a plurality of devices 305, devices 405, and/or devices 505 that may be Christmas ornaments such as Christmas tree ornaments) may display images and/or emit sound or audio based on data transferred in real-time from a user device 320 of the user and the devices (e.g., devices 305, devices 405, and/or devices 505) via the exemplary disclosed paired connection (e.g., a Wi-Fi/Bluetooth streaming connection).

Any desired number of user devices 320 may be automatically paired and automatically control any desired number of exemplary disclosed devices (e.g., devices 305, devices 405, and/or devices 505). System 300 may operate to set priorities or hierarchies of control by user devices 320 over the exemplary disclosed devices. For example, some user devices 320 may have priority of control of some or all exemplary disclosed devices (e.g., devices 305, devices 405, and/or devices 505) relative to other user devices 320. For example, a user device 320 controlled by a user having a central role in a holiday event (e.g., a user playing Santa Claus) may have first priority over a plurality of exemplary disclosed devices (e.g., devices 305, devices 405, and/or devices 505) that may be for example Christmas decorations. When the user having the user device 320 having priority comes within a predetermined distance (e.g., or at a predetermined time or other criteria is met), some or all of a plurality of exemplary disclosed devices (e.g., devices 305, devices 405, and/or devices 505) may all be controlled according to input provided by an app of the user device 320 having priority. For example, the devices may display images, light up, and/or play music to enhance the role played by the user having the user device 320 having priority (e.g., the devices may all play Christmas music and display in unison when a user dressed as Santa Claus approaches a gathering of people or enters a room having the exemplary disclosed devices). A similar operation may be made for any desired holiday or tradition.

At step 630, system 300 may determine whether or not the exemplary disclosed device (e.g., device 305, device 405, or device 505) should continue to operate using the exemplary data sources. System 300 may make this determination based on input received from a user (e.g., via user device 320 and/or actuation of a component of the exemplary disclosed device such as component 495) and/or predetermined operation criteria (e.g., after a predetermined amount of time has passed and/or according to a predetermined schedule or criteria of module 310). If system 300 determines that operation should continue using the currently selected data source, process 600 returns to step 625. If system 300 determines that operation should not continue using the currently selected data source, process 600 proceeds to step 635.

At step 635, system 300 may determine whether or not to select a new or additional data source to use for operation of the exemplary disclosed device (e.g., device 305, device 405, or device 505). System 300 may make this determination based on input received from a user (e.g., via user device 320 and/or actuation of a component of the exemplary disclosed device such as component 495) and/or predetermined operation criteria (e.g., after a predetermined amount of time has passed and/or according to a predetermined schedule or criteria of module 310). If system 300 determines that operation should continue using a new or additional data source, process 600 returns to step 620. If system 300 determines that operation should not continue using a new data source, process 600 ends at step 640, which may include powering off the exemplary disclosed device (e.g., device 305, device 405, or device 505) immediately or after a predetermined amount of time has elapsed.

In at least some exemplary embodiments, the exemplary disclosed device (e.g., device 305, device 405, or device 505) may communicate electronically with user device 320 and/or module 310 for verification of communication and commands. The exemplary disclosed device, in at least some exemplary embodiments, may not include either a camera (e.g., or any other suitable device that records images) or a microphone (e.g., or any other similar device that records sound) to record and transmit information (e.g., data) from the exemplary disclosed device (e.g., device 305, device 405, or device 505) to other components of system 300. For example, the exemplary disclosed device (e.g., device 305, device 405, or device 505) may not include a camera or a microphone for recording data (e.g., and also may not store and/or transmit that recorded data) associated with images or sounds. For example, the exemplary disclosed device (e.g., device 305, device 405, or device 505) may be a passive device (e.g., a non-recording and/or non-transmitting device). The exemplary disclosed device (e.g., device 305, device 405, or device 505) may be a non-data-recording device. The exemplary disclosed device (e.g., device 305, device 405, or device 505) may be a non-camera-equipped and/or a non-microphone-equipped device. Alternatively, it is also contemplated that the exemplary disclosed device may include a camera and/or microphone in at least some exemplary embodiments.

In at least some exemplary embodiments, the exemplary disclosed system, apparatus, and method may be used to display information for including family photos with a real-time audio greeting and/or a video chat (e.g., FaceTime) stream of a paired smart device. For example, the exemplary disclosed device (e.g., device 305, device 405, or device 505) may duplicate a display of the paired display device. For example, if the paired smart device (e.g., user device 320) displaying a video chat (e.g., FaceTime) stream is pointed at the exemplary disclosed device, a remotely-located person engaging in the video chat would be able to see herself or himself displayed on a screen (e.g., component 335, component 435, or component 535) of the exemplary disclosed device.

In at least some exemplary embodiments, the exemplary disclosed method may include providing an interactive device (e.g., device 305, device 405, or device 505) having at least one of a display screen and an audio component, pairing the interactive device with a user device (e.g., user device 320), transferring data to the interactive device, and displaying images via the display screen or emitting sound via the audio component based on the transferred data. The interactive device may be a non-transmitting device. The interactive device may be a non-recording device. The interactive device may be both a non-camera-equipped device and a non-microphone-equipped device. The interactive device may receive data from the user device but may not transmit data to the user device. The interactive device may be a Christmas ornament that is paired with the user device that may be a smartphone. The interactive device may be paired with the user device via at least one of a Wi-Fi data-streaming connection and a Bluetooth data-streaming connection. Transferring data to the interactive device may include at least one of transferring data via a storage medium physically inserted into the interactive device and transferring data via a data-streaming connection between the paired interactive device and user device. The exemplary disclosed method may also include controlling the display screen and the audio component by actuating a button disposed on the interactive device. The exemplary disclosed method may further include controlling the display screen and the audio component by using the user device to control a controller of the interactive device. The interactive device may be a bell-shaped Christmas ornament or a ball-shaped Christmas ornament.

In at least some exemplary embodiments, the exemplary disclosed method may include providing a plurality of interactive devices (e.g., device 305, device 405, or device 505), each interactive device having a display screen and an audio component, pairing at least one of the plurality of interactive devices with at least one of a plurality of user devices (e.g., user device 320) to provide a paired set of at least one paired interactive device and at least one paired user device, streaming data from the at least one paired user device to the at least one paired interactive device of the paired set, and displaying images via at least one display screen of the at least one paired interactive device or emitting sound via at least one audio component of the at least one paired interactive device based on the streamed data. The at least one paired interactive device of the paired set may be a non-recording device. The at least one paired interactive device of the paired set may be both a non-camera-equipped device and a non-microphone-equipped device. The at least one paired interactive device may include a plurality of paired interactive devices that may all be paired to the at least one paired user device that is a single user device. Each of the plurality of paired interactive devices may display images and emit sound when the single user device is within a predetermined distance of the plurality of paired interactive devices. Each of the plurality of interactive devices may be one of a ball-shaped Christmas ornament and a bell-shaped Christmas ornament having a flat front portion on which one of a liquid-crystal display and a light-emitting diode display is disposed.

The exemplary disclosed system, apparatus, and method may provide an efficient and effective technique for providing an interactive device that may be controlled or affected based on a presence or actions of a user and/or another device such as a mobile device (e.g., smartphone or other computing device). For example, the exemplary disclosed system, apparatus, and method may allow for a decorative item such as an ornament to operate based on input received from a user via physical manipulation, input data received from a user device, input received from an external data source, and/or any other suitable control technique. The exemplary disclosed system, apparatus, and method may provide an interactive ornament that may entertain users and/or add to a holiday atmosphere based on interacting with nearby users to display images, emit music or audio messages, illumination, and/or other suitable indications that may be customized to specific users (e.g., nearby users).

Figure 8:
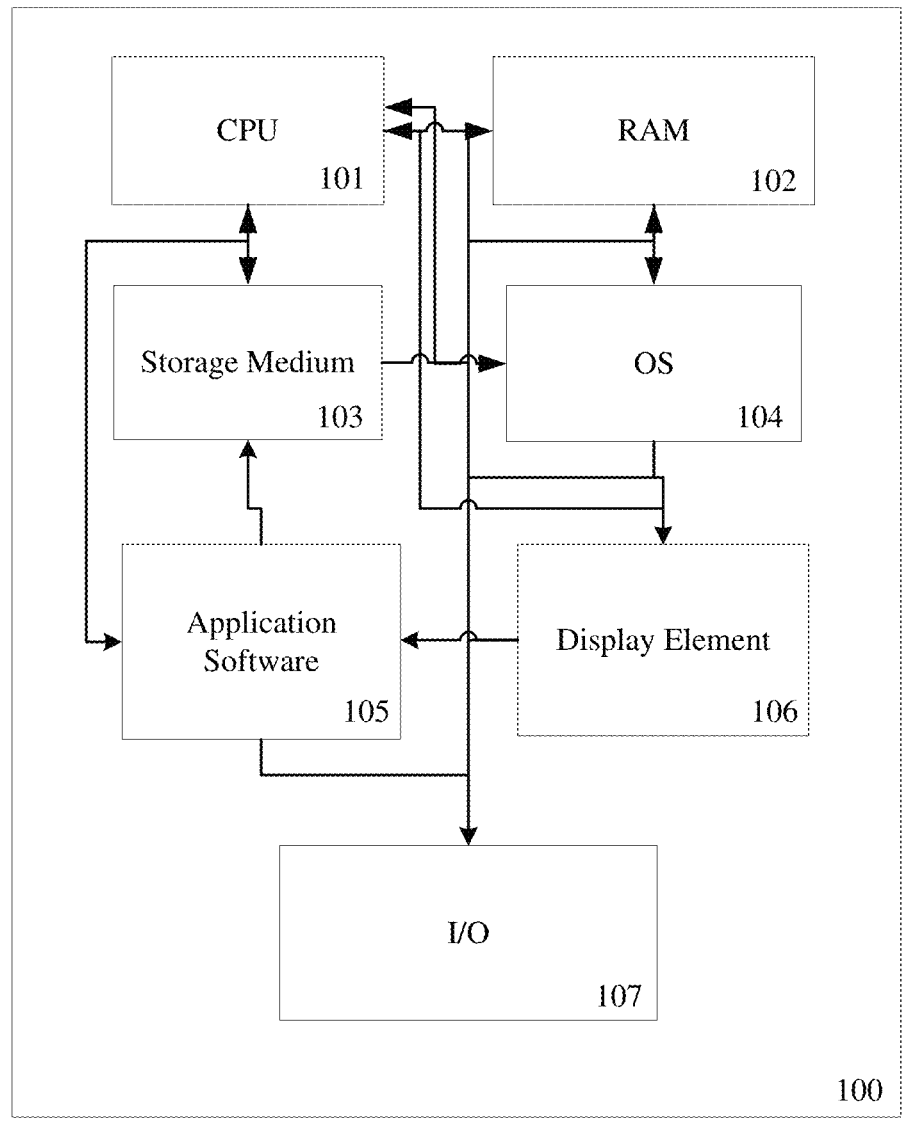
FIG. 8 is a schematic illustration of an exemplary computing device, in accordance with at least some exemplary embodiments of the present disclosure.

An illustrative representation of a computing device appropriate for use with embodiments of the system of the present disclosure is shown in FIG. 8. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 9, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 9:
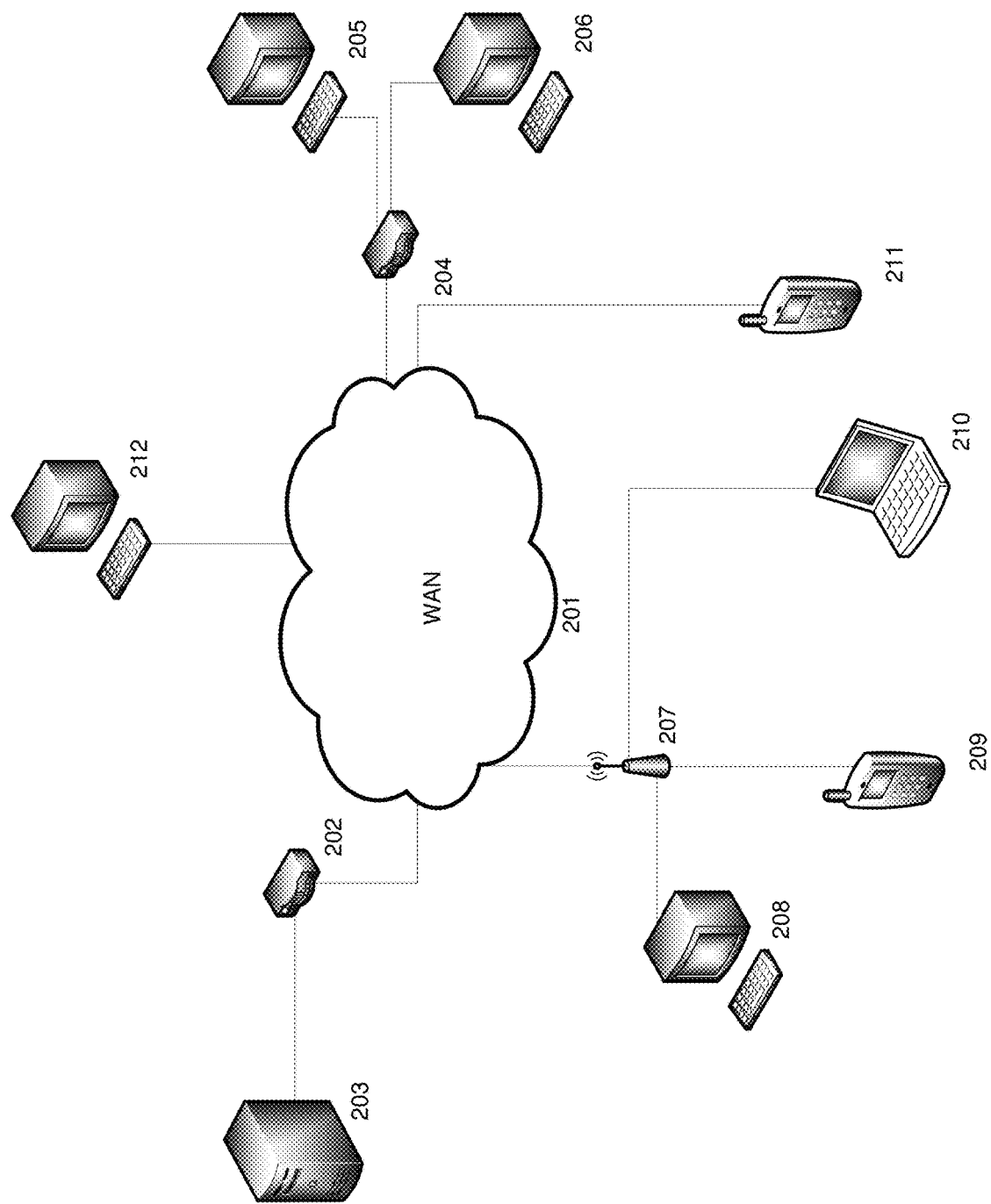
FIG. 9 is a schematic illustration of an exemplary network, in accordance with at least some exemplary embodiments of the present disclosure.

Referring to FIG. 9, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 9, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A method, comprising:
   providing an interactive device having at least one of a display screen and an audio component;
   pairing the interactive device with a user device;
   allowing one-way data stream transfer from the user device to the interactive device based on the pairing;
   preventing data transfer from the interactive device to the user device based on the pairing; and
   displaying images via the display screen or emitting sound via the audio component based on the one-way data stream transfer;
   wherein the interactive device is a non-transmitting device; and
   wherein the interactive device is a non-camera-equipped device or a non-microphone-equipped device.

2. The method of claim 1, wherein the interactive device is a non-recording device.

3. The method of claim 2, wherein the interactive device is both a non-camera-equipped device and a non-microphone-equipped device.

4. The method of claim 1, wherein the interactive device receives data from the user device but does not transmit data to the user device based on the pairing.

5. The method of claim 1, wherein the interactive device is a Christmas ornament that is paired with the user device that is a smartphone.

6. The method of claim 1, wherein the interactive device is paired with the user device via at least one of a Wi-Fi data-streaming connection and a Bluetooth data-streaming connection.

7. The method of claim 1, wherein allowing the one-way data stream transfer to the interactive device includes at least one of transferring data via a storage medium physically inserted into the interactive device and transferring data via a data-streaming connection between the paired interactive device and user device.

8. The method of claim 1, further comprising controlling the display screen and the audio component by actuating a button disposed on the interactive device.

9. The method of claim 1, further comprising controlling the display screen and the audio component by using the user device to control a controller of the interactive device.

10. The method of claim 1, wherein the interactive device is a bell-shaped Christmas ornament or a ball-shaped Christmas ornament.

11. An interactive device that is pairable with a user device, comprising:
a housing;
a data storage;
a controller configured to pair the interactive device with the user device, the pairing allowing only one-way image and audio data stream transfer from the user device to the interactive device, and the pairing preventing image and audio data stream transfer from the interactive device to the user device;
a display screen controlled by the controller; and
an audio component controlled by the controller;
wherein the display screen displays images and the audio component emits sound based on the one-way image and audio data stream transfer; and
wherein the interactive device is a non-camera-equipped device.

12. The interactive device of claim 11, wherein the interactive device is a non-data-recording passive device.

13. The interactive device of claim 12, wherein the interactive device does not transmit data to the user device.

14. The interactive device of claim 11, wherein the interactive device is both a non-camera-equipped and a non-microphone-equipped device.

15. A method, comprising:
providing a plurality of interactive devices, each interactive device having a display screen and an audio component;
pairing at least one of the plurality of interactive devices with at least one of a plurality of user devices to provide a paired set of at least one paired interactive device and at least one paired user device;
streaming data from the at least one paired user device to the at least one paired interactive device of the paired set; and
preventing data transfer from the at least one paired interactive device to the at least one paired user device based on the pairing;
displaying images via at least one display screen of the at least one paired interactive device or emitting sound via at least one audio component of the at least one paired interactive device based on the streamed data;
wherein the at least one paired interactive device of the paired set is a non-recording device; and
wherein each interactive device of the plurality of interactive devices is a non-camera-equipped device and a non-microphone-equipped device.

16. The method of claim 15, wherein the at least one paired interactive device includes a plurality of paired interactive devices that are all paired to the at least one paired user device that is a single user device.

17. The method of claim 16, wherein each of the plurality of paired interactive devices displays images and emits sound when the single user device is within a predetermined distance of the plurality of paired interactive devices.

18. The method of claim 15, wherein each of the plurality of interactive devices is one of a ball-shaped Christmas ornament and a bell-shaped Christmas ornament having a flat front portion on which one of a liquid-crystal display and a light-emitting diode display is disposed.

19. The method of claim 15, wherein:
the at least one paired interactive device includes a plurality of paired interactive devices;
the at least one paired user device includes a plurality of paired user devices; and
the plurality of paired user devices includes a priority paired user device that has a first pairing priority over the other of the plurality of paired user devices.

20. The method of claim 19, further comprising:
pairing all of the plurality of paired interactive devices with the priority paired user device when the priority paired user device is within a predetermined distance of the plurality of paired interactive devices; and
streaming data from the priority paired user device to all of the plurality of paired interactive devices.

* * * * *